United States Patent [19]

Ficker

[11] Patent Number: 4,762,484
[45] Date of Patent: Aug. 9, 1988

[54] APPARATUS FOR THE CONTINUOUS, DRY, NON-PRESSURIZED REGENERATION OF SALVAGED RUBBER

[75] Inventor: Stefan Ficker, Munich, Fed. Rep. of Germany

[73] Assignee: Ingenieurburo S. Ficker, Munich, Fed. Rep. of Germany

[21] Appl. No.: 4,101

[22] Filed: Jan. 16, 1987

Related U.S. Application Data

[62] Division of Ser. No. 709,038, Mar. 7, 1985, Pat. No. 4,665,101.

[30] Foreign Application Priority Data

Mar. 8, 1984 [DE]  Fed. Rep. of Germany ....... 3408493

[51] Int. Cl.⁴ .......................... B29C 35/12; H05B 6/64
[52] U.S. Cl. ..................... 425/174.8 R; 219/10.55 A; 219/10.55 R; 219/10.57
[58] Field of Search ................. 219/10.55 A, 10.55 R, 219/10.57; 425/174.4, 174.8 R, 174.8 E

[56] References Cited

U.S. PATENT DOCUMENTS

| | | | |
|---|---|---|---|
| 2,353,362 | 7/1944 | Rudd | 264/DIG. 65 |
| 3,626,838 | 12/1971 | Gorakhpurwalla | 219/10.55 A |
| 4,275,283 | 6/1981 | Focht | 219/10.55 A |

FOREIGN PATENT DOCUMENTS

| | | |
|---|---|---|
| 667968 | 11/1938 | Fed. Rep. of Germany . |
| 3242609 | 6/1983 | Fed. Rep. of Germany . |
| 3408493 | 4/1986 | Fed. Rep. of Germany . |
| 919385 | 3/1947 | France . |
| 245370 | 7/1947 | Switzerland . |

Primary Examiner—Willard Hoag
Attorney, Agent, or Firm—Karl F. Ross; Herbert Dubno; Ronald Lianides

[57] ABSTRACT

Comminuted salvaged rubber is heated to the reclaiming temperature in a two-stage process such that part of the overall heat required is introduced by microwave heating and the remainder by convectional heating. Material preheated during the first stage is transferred to the second stage in such a way that the relative position of all the particles is maintained with as little change as possible. Since the temperature profile of microwave heating shows a maximum in the interior and a minimum at the periphery, whereas that of convectional heating is just the reverse, the temperature distribution within the material can be evened out to a great extent by combining these two different methods of heating. Since it is no longer necessary in this case to heat the material to such an extent convectionally, it is possible to avoid caking and the formation of deposits, and thus to considerably improve the quality of the reclaimed rubber.

11 Claims, 2 Drawing Sheets

DISTANCE FROM HEATING SURFACE

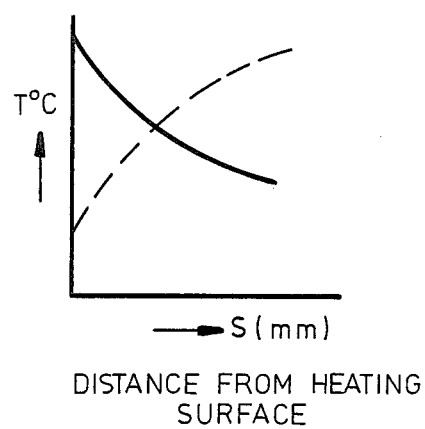
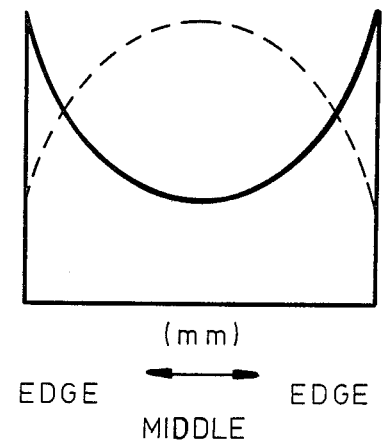
DISTANCE FROM HEATING SURFACE
EDGE ←→ EDGE
MIDDLE
FIG. 1
FIG. 2
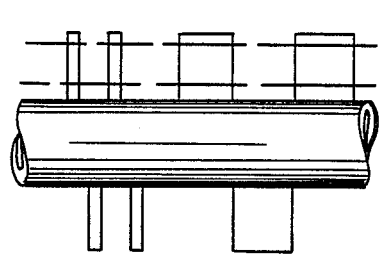
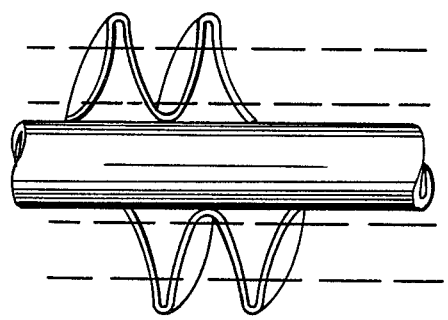
FIG. 3
FIG. 4

U.S. Patent    Aug. 9, 1988    Sheet 2 of 2    4,762,484 ial from grain to grain and also to the interior of the
APPARATUS FOR THE CONTINUOUS, DRY, NON-PRESSURIZED REGENERATION OF SALVAGED RUBBER This is a divisional of co-pending application Ser. No. 709,038, filed on Mar. 7, 1985, now U.S. Pat. No. 4,665,101.

FIELD OF THE INVENTION

The present invention relates to a further improvement in the non-pressurized, dry and continuous method - using hollow-flight screw apparatuses - for regenerating salvaged rubber and to means for the implementation thereof, which means, under full adherence to the known advantages of the method, especially its ecological benefits, make possible a considerable improvement in the quality of the reclaimed rubber while, at the same time, guaranteeing an increased throughput for a given heat exchange surface for a given apparatus.

BACKGROUND OF THE INVENTION

The invention employs the known basic principle referred to above of first depolymerizing the salvaged rubber, the same - as far as "reinforced" rubber is concerned - having been freed of any fabric plies and/or steel wire inserts and reduced to a suitable particle size of 1 to 5 mm, by heating in the presence of softeners and reclaiming agents such as NAFTOLEN and RENACIT and then subjecting it to rapid cooling. In the following the term "salvaged rubber" shall refer both to synthetic rubbers such as BUNA and the like as well as to used natural rubber or caoutchouc, which are also obtained in the form of discarded vehicle tires.

It is common knowledge that the regeneration cannot be initiated beneath a critical threshold temperature which, depending on the nature of the salvaged rubber, varies approximately between 150° and 180° C., and that if either the optimal reclaiming temperature or the optimal retention time at this or even higher temperatures is exceeded, "over-regeneration", with the accompanying severe reduction in quality, is the result. Furthermore, the reduced quality of the reclaimed rubber, which in all known cases is clearly inferior to that of new rubber, is attributable not least to the fact that always, in all known methods, not only the individual salvaged rubber particles but also the different zones of each particle are exposed to different temperatures for different lengths of time, with the result that over- and-/or under-regeneration of a considerable proportion of the starting material has hitherto been inevitable.

In practice, for the regeneration of rubber, use is made today almost exclusively only of the autoclave process. This process involves treating the salvaged rubber under pressure and heat with chemicals. This process, however, due not only to difficulty of operation and inefficiency but in particular to the considerable environmental pollution, is of no significance in developed countries. In addition to this, all the disadvantages of an extremely lengthy (5-12 h) discontinuous procedure are inherent in the method.

The only dry regeneration process, even if applied only to a very limited extent, is the extrusion process, during which the heat required for the regeneration is introduced into the salvaged rubber by way of convection and the simultaneous application of high pressure. Due to high installation and operating costs as well as to the poor quality of the reclaimed rubber, this process is virtually obsolete.

SUMMARY OF THE INVENTION

According to the present invention the temperature distribution during the regeneration process is rendered much more uniform with respect both to the bulk material from grain to grain and also to the interior of the individual grains themselves, with the result that a considerable improvement in the quality of the reclaimed rubber is possible since the thermal energy required for heating up the material is introduced into the same only in part by way of convection, the remainder being introduced by way of heating with microwaves. In the Federal Republic of Germany there is a standard frequency, namely 2450±50 MHz, for this purpose. The invention thus makes use of the fact that the spatial temperature distribution using this type of heating assumes precisely the opposite course to that characteristic of convectional heating.

By appropriately superimposing these two opposing temperature profiles it is possible according to the invention to equalize to a large extent the variation of temperature both in the bulk material and within the individual grains themselves, something which is not possible according to any of the known methods.

It is furthermore important according to the invention that on completion of the regeneration, the material is immediately and rapidly cooled - using forced cooling means, preferably a cooling drum - beneath the reclaiming temperature, best of all to a temperature below 80° C.

The use of high-frequency heating for regenerating caoutchouc was in fact proposed in the FR-PS 911 385 and in CH-PS 245 370, but not, contrary to the invention, in conjunction with simultaneous convectional heating; this meant that in these processes it was equally impossible to even out the temperature distribution as in the case of the known methods employing convectional heating, and this disadvantage is clearly conceded in the second of the two patent specifications referred to.

By combining the two different methods of heating according to the invention the temperature differences, which are usually more than 100° C. (temperature differences of over 140° C. have sometimes been recorded) and occur both in the known methods employing convectional heating and in those employing microwave heating, between the different parts of the material under treatment can be reduced to as little as 15°-20° C. if the course of the process is carefully supervised.

For the combined heating of the rubber it is expedient not to employ the two different methods of heating at the same time but successively, in two different apparatuses. It is preferable to apply microwave heating during the first and convectional heating during the second stage.

The advantage offered by this preferred sequence consists primarily in that the temperature of the heating means and thus also of the reclaiming screw can be kept lower - in practice about 20°-50° C. - at the convectional heating stage than would be the case with the reverse sequence. The avoidance of caking thus made possible offers the further advantage of being able to employ a single-screw apparatus instead of the self-cleaning double-screw apparatus with intermeshing helices, that was hitherto indispensable for the convectional heating of salvaged rubber. Use of a single-screw apparatus in turn offers a series of further advantages. It is expedient in this case to coat the screw surface as well as the interior wall of the cylindrical casing with polymers of fluoridated, fully halogenated olefins exhibiting good anti-adhesion properties and incorporating strength-increasing mineral additives that exhibit a sufficient degree of hardness up to 250° C.

A striking advantage of the single-screw apparatus compared to the double-screw type is the ease of manufacture - due to the simplified geometry - of the screw and circular trough. A further advantage is the reduction in dead spaces and the resulting increase in filling ratio, as well as the more uniform retention time for all the particles. With this preferred embodiment of the invention it becomes possible for the first time to completely eliminate caking; as a result not only the quality of the reclaimed rubber is improved but also the heat transfer and thus - referred to the heat exchange surface - an increased throughput made possible.

Although all these advantages are themselves exemplary, there is yet another advantage which is of great importance for the purpose of the present invention. Namely, with a single-screw apparatus it is possible to use screw blades of rectangular or preferably square cross-section instead of screw blades of curved cross-section, which are indispensable for intermeshing double screws. This means that the material being treated, whatever the distance from the axis, is bound to have the same layer thickness - measured from screw flank to screw flank and thus, when heated, will exhibit to a large extent the same average temperature. In contrast to this the blades of the double-screw apparatuses, which alone could be used hitherto for the dry regeneration of rubber, introduced at different distances from the screw axis the same amount of heat into quantities of material that varied in size, with the result that these were heated to varying degrees.

According to the preferred embodiment of the invention, in which high-frequency heating is applied during the first procedural stage, the rubber being treated is heated during this stage (HF-heating) until the material in the interior zone of the HF heating canal reaches the reclaiming temperature or one just below. The thus heated material is then, if necessary after a suitably selected intermediate retention time, fed to the reclaiming screw, which is preferably designed as a hollow-flight screw heat exchanger, in which the material of the outer zone is heated further until it too reaches the reclaiming temperature of - depending on the type of material to be reclaimed - 180° to 240° C., thus being depolymerized.

For the procedural stage involving microwave heating a simple conveyor belt is suitable, preferably made of material such as plastic which is transparent to microwaves, and having a high-frequency radiation source disposed above and if necessary also below the conveyor belt, or else a vertical shaft having suitable damping elements at the upper and lower ends thereof to prevent microwave rays from emerging. It is at all costs essential that the transfer from the first to the second procedural stage ensues such that the position of all the particles relative to each other is maintained with as little change as possible; in this way one achieves the most effective opposite effect with regard to the temperature distribution resulting from the first procedural stage. For this reason the internal cross-sections of the microwave canal and the heating screw should correspond with each other as far as possible, with regard both to the absolute size and to the geometrical shape.

BRIEF DESCRIPTION OF THE DRAWING

The above and other features and advantages of the invention will become more readily apparent from the following description, reference being made to the accompanying drawing, in which;

FIG. 1 represents the temperature profile in the bulk material;

FIG. 2 represents the temperature profile within an individual grain;

FIG. 3 is a diagrammatic axial sectional view through a single-screw flight conveyor;

FIG. 4 is a diagrammatic axial sectional view through a double-screw flight conveyor;

SPECIFIC DESCRIPTION

In FIGS. 1 and 2, the temperature distribution in the case of convectional heating is represented by the solid lines, and in the case of microwave heating, it is represented by the dashed lines.

FIG. 3 shows a hollow, single-screw conveyor having screw blades of rectangular or square cross-section, which enables the material being heated, whatever the distance from the axis, to have a uniform layer thickness measured from screw flank to screw flank and thus, when heated, will exhibit to a large extent the same average temperature. In contrast, the hollow curved blades of FIG. 4 tend to heat the material to varying degrees at different distances from the axis.

Figure 5:
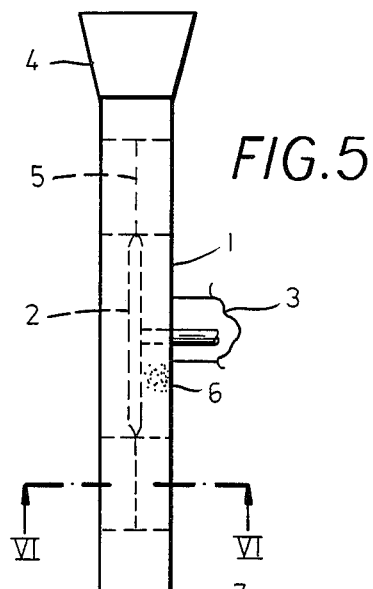
FIG. 5 is an elevational view of a vertical microwave heating channel.
Figure 6:
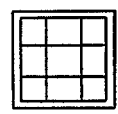
FIG. 6 is a sectional view taken along line VI—VI of FIG. 5.

In FIGS. 5 and 6 reference numeral 1 denotes the microwave heating channel, 2 the brush-discharge electrode emitting the microwaves, 3 the magnetron supplying the electrode 2, 4 the charging funnel, 5 the damping elements which prevent the microwaves from emerging from the channel 1, 6 denotes the rubber particles, and 7 an intermediate channel in which the material coming from the first procedural stage can be retained for a given time without being heated further. The length of the intermediate channel 7, and thus the length of time the material is retained there, is preferably adjustable. The intermediate channel 7 is connected via a flexible connecting piece 8 and the curved element 9 with the vibrating conveyor trough 10, by way of which the material issuing from the zone 7 is fed, without disturbing its layering and at a throughput speed that can be accurately regulated, to the charging trough 11; in this way it is possible to simultaneously regulate the retention time in the microwave channel 1 and thus the degree to which the material is heated there.

Figure 7:
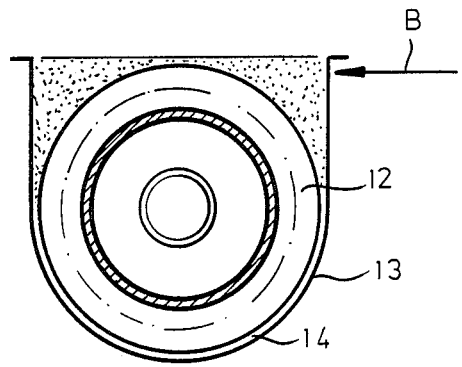
FIG. 7 is a cross sectional view through a part of the apparatus forming the convectional heating stage.

The charging trough 11 in turn feeds the material to the hollow-flight heat exchanger 112 shown in axial section in FIG. 7 having a screw 14 supplied with heating liquid. The material is fed into the center of the first screw flight, the charging trough 11 following this at the same axial speed - so that the material is always fed into the center of the screw flight - until the first screw flight comes to an end. Trough 11 then returns rapidly to the starting position, and the process is repeated continuously. The charging end 11a of charging trough 11 can also be slid to and fro and adjusted accordingly, as shown by arrow A, so as to ensure that the charge material is always supplied to the reclaiming screw in such a way that it falls away uniformly on both sides of the screw flight, and that trough 13 fills uniformly, cf. arrow B.

I claim:

1. An apparatus for the continuous dry, nonpressurized reclaiming of a material selected from the group which consists of salvaged rubber, plastics and mixtures thereof, said apparatus comprising:
   a vertical microwave heating channel formed at opposite ends with means for preventing escape of microwaves from said channel and, intermediate said means, a brush-discharge electrode for generating microwaves in said channel to heat said material as it transverses said channel;
   means forming an inlet at an upper end of said channel for feeding said material in comminuted form to said channel;
   a curved guide element connected to a lower end of said channel for transferring the microwave-heated comminuted material from said channel to a charging trough with minimal relative change in positions of particles of said material; and
   a hollow-flight screw heat exchanger positioned to receive the microwave-heated comminuted material from said trough and comprising a casing and a fluid-heated hollow-flight screw rotatable in said casing to heat said material to a reclaiming temperature.

2. The apparatus defined in claim 1 said screw is a single hollow-flight screw and said casing is a cylindrical casing receiving said screw.

3. The apparatus defined in claim 2 wherein the flight of said screw is of rectangular cross section.

4. The apparatus defined in claim 3 wherein said flight is of square cross section.

5. The apparatus defined in claim 1 wherein said channel is of rectangular cross section.

6. The apparatus defined in claim 5 wherein said channel is of square cross section.

7. The apparatus defined in claim 5 wherein the flight of said screw is is square cross section and the cross sections of said flight and said channel have similar dimensions.

8. The apparatus defined in claim 1, further comprising a coating on the flight of said screw composed of a cross-linked fluoridated and fully halogenated polyolefin polymer containing a strength-increasing additive.

9. The apparatus defined in claim 8, further comprising a coating on the interior of said casing composed of a cross-linked fluoridated and fully halogenated polyolefin polymer containing a strength-increasing additive.

10. The apparatus defined in claim 1, further comprising a coating on the interior of said casing composed of a cross-linked fluoridated and fully halogenated polyolefin polymer containing a strength-increasing additive.

11. The apparatus defined in claim 1, further comprising an unheated intermediate channel between said microwave heating channel and said curved element.

* * * * *